(12) United States Patent
Park

(10) Patent No.: US 12,091,008 B2
(45) Date of Patent: Sep. 17, 2024

(54) PLATOONING CONTROL METHOD AND SYSTEM

(71) Applicant: HYUNDAI MOBIS CO., LTD., Seoul (KR)

(72) Inventor: Seung Jin Park, Seoul (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 141 days.

(21) Appl. No.: 17/357,289

(22) Filed: Jun. 24, 2021

(65) Prior Publication Data
US 2021/0402994 A1 Dec. 30, 2021

(30) Foreign Application Priority Data
Jun. 25, 2020 (KR) ........................ 10-2020-0077619

(51) Int. Cl.
*B60W 30/16* (2020.01)
*B60W 30/09* (2012.01)
(Continued)

(52) U.S. Cl.
CPC .......... *B60W 30/162* (2013.01); *B60W 30/09* (2013.01); *G01C 21/12* (2013.01); *G01S 19/52* (2013.01); *G08G 1/166* (2013.01); *G08G 1/22* (2013.01); *B60W 2520/10* (2013.01); *B60W 2520/16* (2013.01); *B60W 2552/15* (2020.02);
(Continued)

(58) Field of Classification Search
CPC .............. B60W 30/162; B60W 30/09; B60W 2552/15; B60W 2554/802; B60W 2556/60; B60W 2520/10; B60W 2520/16; G01C 21/12; G01S 19/52; G08G 1/166; G08G 1/22
See application file for complete search history.

(56) References Cited

U.S. PATENT DOCUMENTS 9,987,985 B2 6/2018 Goo et al.
2014/0188375 A1 7/2014 Kumar et al.
(Continued)

FOREIGN PATENT DOCUMENTS

CN 105206112 A 12/2015
CN 107533795 A 1/2018
(Continued)

OTHER PUBLICATIONS

Office Action issued Jun. 17, 2023 for counterpart Chinese Patent Application No. 202110707815.3 (see English translation).

*Primary Examiner* — Dale W Hilgendorf
*Assistant Examiner* — Frank T Glenn, III
(74) *Attorney, Agent, or Firm* — MORGAN, LEWIS & BOCKIUS LLP

(57) ABSTRACT

A platooning control method includes: determining whether a preceding vehicle, which is located in front of a host vehicle, has entered a slope section when a plurality of vehicles are moving on a road, acquiring longitudinal distance information between the host vehicle and the preceding vehicle using a Dead-Reckoning (DR) sensor of the host vehicle upon determining that the preceding vehicle has entered the slope section, and performing platooning control by the host vehicle with the plurality of vehicles in the slope section using the longitudinal distance information acquired by the DR sensor and speed information.

14 Claims, 8 Drawing Sheets

(51) Int. Cl.
   *G01C 21/12*   (2006.01)
   *G01S 19/52*   (2010.01)
   *G08G 1/00*    (2006.01)
   *G08G 1/16*    (2006.01)

(52) U.S. Cl.
   CPC ... *B60W 2554/802* (2020.02); *B60W 2556/50* (2020.02)

(56) References Cited

U.S. PATENT DOCUMENTS

| | | | |
|---|---|---|---|
| 2016/0016509 A1* | 1/2016 | Schleicher | B60Q 1/46 340/903 |
| 2016/0039425 A1* | 2/2016 | Jeon | B60W 50/08 701/70 |
| 2016/0214609 A1* | 7/2016 | Yamaoka | B60W 30/0956 |
| 2017/0232943 A1* | 8/2017 | Brooks | G08G 1/22 701/19 |
| 2017/0297563 A1* | 10/2017 | Kava | B60W 50/0098 |
| 2018/0057003 A1* | 3/2018 | Hyun | B60W 60/0016 |
| 2018/0281763 A1* | 10/2018 | Ohmori | B60T 8/17552 |
| 2020/0057453 A1* | 2/2020 | Laws | G05D 1/0088 |
| 2020/0298754 A1* | 9/2020 | Zhu | B60Q 1/525 |
| 2020/0351906 A1* | 11/2020 | Chen | H04W 8/22 |

FOREIGN PATENT DOCUMENTS

| | | | |
|---|---|---|---|
| CN | 111231951 A | 6/2020 | |
| KR | 10-1997-0026248 A | 6/1997 | |
| KR | 10-2016-0134016 A | 11/2016 | |
| KR | 10-2017-0016177 A | 2/2017 | |
| KR | 10-2020-0058616 A | 5/2020 | |
| WO | WO-2017042990 A1 * | 3/2017 | B60K 35/00 |

* cited by examiner

PLATOONING CONTROL METHOD AND SYSTEM

CROSS-REFERENCE TO RELATED APPLICATION

This application claims the benefit of Korean Patent Application No. 10-2020-0077619, filed on Jun. 25, 2020 with the Korean Intellectual Property Office, the disclosure of which is herein incorporated by reference in its entirety.

TECHNICAL FIELD

The present disclosure relates to a platooning control method and system capable of stably performing vehicle platooning control in a slope section.

BACKGROUND

Platooning is group driving of successive vehicles in the state in which the vehicles remain adjacent to each other by controlling the distance between the vehicles. Information, such as the distance from a preceding vehicle and the speed of the preceding vehicle, is detected using a sensor installed in each vehicle, and the detected information is exchanged between the vehicles, whereby the vehicles drive in the state in which the distance between the vehicles is maintained.

In the case in which platooning vehicles drive in a slope section, however, a preceding vehicle disappears from the view of a host vehicle due to limitations in field of view (FOV) of a front sensor mounted in each vehicle, such as a camera or radar, when the vehicles enter a downward slope after moving over the top of the slope section.

As a result, there is instantaneous difficulty in platooning control. When collision danger occurs at this point in time, it is not possible to effectively cope therewith. Consequently, the distance between the vehicles may be abruptly decreased, and therefore an accident may occur.

The matters disclosed in this section are merely for enhancement of understanding of the general background of the disclosure and should not be taken as an acknowledgment or any form of suggestion that the matters form the related art already known to a person skilled in the art.

SUMMARY

The present disclosure has been made in view of the above problems, and it is an object of the present disclosure to provide a platooning control method and system capable of stably performing vehicle platooning control in a slope section.

In accordance with an aspect of the present disclosure, the above and other objects can be accomplished by the provision of a platooning control method including a slope entry determination step of a control device determining whether a preceding vehicle, which is located to be in front of a host vehicle, has entered a slope section when a plurality of vehicles are moving on a road, a slope distance information calculation step of the control device acquiring longitudinal distance information between the host vehicle and the preceding vehicle using a dead-reckoning (DR) sensor of the host vehicle upon determining that the preceding vehicle has entered the slope section, and a slope driving control step of the control device performing platooning control by the host vehicle with the plurality of vehicles in the slope section using the longitudinal distance information acquired by the DR sensor and speed information.

The slope entry determination step may include determining whether the preceding vehicle has entered the slope section using the pitch value of the preceding vehicle.

The slope entry determination step may further include, in the case in which the pitch value of a lead vehicle, among platooning vehicles, is equal to or greater than a set value, determining whether the lead vehicle has entered the slope section using navigation information, upon determining that the lead vehicle has entered the slope section, detecting the pitch value of each of the platooning vehicles, and, in the case in which the pitch value of the preceding vehicle is equal to or greater than the set value, determining that the preceding vehicle has entered the slope section.

The platooning control method may further include a slope exit determination step of determining whether the host vehicle has exited the slope section in the slope driving control step, a flatland distance information calculation step of, upon determining that the host vehicle has exited the slope section, acquiring longitudinal distance information from the preceding vehicle using a front sensor of the host vehicle, and a flatland driving control step of performing platooning control by the host vehicle with the plurality of vehicles in a flatland section once the host vehicle has deviated from the slope section based on the longitudinal distance information acquired by the front sensor and the speed information.

The slope exit determination step includes, in the case in which the pitch value of the host vehicle is increased to the set value or more, is decreased to less than the set value, and then is increased again to the set value, determining that the host vehicle has exited the slope section.

The platooning control method may further include a flatland distance information acquisition step of the control device acquiring longitudinal distance information between the host vehicle and the preceding vehicle using a front sensor of the host vehicle in a case in which the preceding vehicle is on a flatland section, and a flatland driving control step of the control device performing the platooning control in the flatland section based on the longitudinal distance information acquired by the front sensor and the speed information.

The speed information may be acquired by a Global Positioning System (GPS).

The slope driving control step includes, in the case in which the host vehicle has entered a downward slope, adjusting a deceleration amount of the host vehicle based on the inclination of the downward slope and reflecting the adjusted deceleration amount of the host vehicle in the platooning control.

The slope driving control step may further include calculating a time to collision using the distance and a relative speed between the host vehicle and the preceding vehicle, calculating a required deceleration value of the host vehicle necessary to reduce the relative speed between the host vehicle and the preceding vehicle based on the time to collision, reflecting the inclination of the downward slope in the required deceleration to compensate for the required deceleration, and calculating a target braking control value necessary to realize a required deceleration compensation value and transmitting the calculated target braking control value to be reflected in the platooning control.

In accordance with another aspect of the present disclosure, there is provided a platooning control system including a processor configured to: determine whether a preceding vehicle, which is located to be in front of a host vehicle, has entered a slope section when a plurality of vehicles are moving on a road, acquire longitudinal distance information from the preceding vehicle using a dead-reckoning (DR) sensor of the host vehicle upon determining that the preceding vehicle has entered the slope section, and perform platooning control by the host vehicle with the plurality of vehicles in the slope section using the longitudinal distance information acquired by the DR sensor and speed information.

The processor may be further configured to determine whether the preceding vehicle has entered the slope section using the pitch value of the preceding vehicle.

The processor may be configured to: in the case in which the pitch value of a lead vehicle, among platooning vehicles, is equal to or greater than a set value, determine whether the lead vehicle has entered the slope section using navigation information, to, upon determining that the lead vehicle has entered the slope section, detect the pitch value of each of the platooning vehicles, and to, in the case in which the pitch value of the preceding vehicle is equal to or greater than the set value, determine that the preceding vehicle has entered the slope section.

The processor may be further configured to: determine whether the preceding vehicle has exited the slope section, upon determining that the preceding vehicle has exited the slope section, acquire longitudinal distance information from the preceding vehicle using a front sensor of the host vehicle, and perform platooning control by the host vehicle with the plurality of vehicles in a flatland section once the host vehicle has deviated from the slope section based on the longitudinal distance information acquired by the front sensor and the speed information.

The processor may be further configured to, in the case in which the pitch value of the host vehicle is increased to the set value or more, is decreased to less than the set value, and then is increased again to the set value, determine that the host vehicle has exited the slope section.

The processor may be further configured to: acquire longitudinal distance information from the preceding vehicle using a front sensor of the host vehicle before the preceding vehicle enters the slope section, and perform platooning control by the host vehicle with the plurality of vehicles in the flatland section based on the longitudinal distance information acquired by the front sensor and the speed information.

The speed information may be acquired by a Global Positioning System (GPS).

In the case in which the host vehicle has entered a downward slope, the deceleration amount of the host vehicle may be adjusted based on the inclination of the downward slope and the adjusted deceleration amount of the host vehicle may be reflected in the platooning control.

The processor may be further configured to: calculate a time to collision using the distance and relative speed between the host vehicle and the preceding vehicle, calculate a required deceleration value of the host vehicle necessary to reduce the relative speed between the host vehicle and the preceding vehicle based on the time to collision, reflect the inclination of the downward slope in the required deceleration value to compensate for the required deceleration value, and calculate a target braking control value necessary to realize a required deceleration compensation value and transmit the calculated target braking control value to the driving controller to be reflected in the platooning control.

BRIEF DESCRIPTION OF THE DRAWINGS

The above and other objects, features and other advantages of the present disclosure will be more clearly understood from the following detailed description taken in conjunction with the accompanying drawings, in which.

DETAILED DESCRIPTION OF THE PREFERRED EMBODIMENTS

Figure 1:
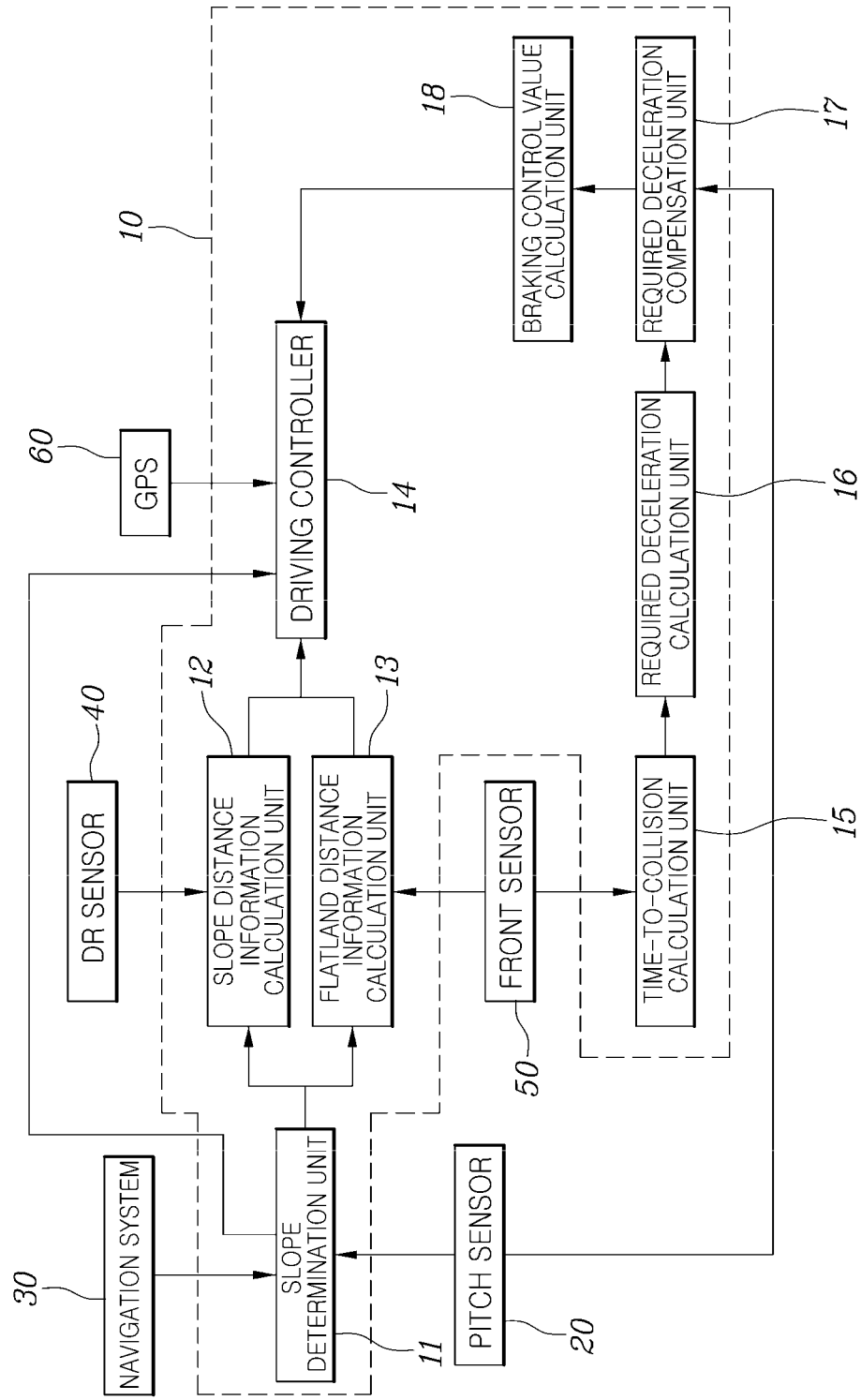
FIG. 1 is a view showing the construction of a platooning control system according to the present disclosure.

Reference will now be made in detail to the preferred embodiments of the present disclosure, examples of which are illustrated in the accompanying drawings.

Specific structural or functional descriptions of the embodiments of the present disclosure disclosed in this specification or this disclosure are given only for illustrating embodiments of the present disclosure. Embodiments of the present disclosure may be realized in various forms, and should not be interpreted to be limited to the embodiments of the present disclosure disclosed in this specification or this disclosure.

Since the embodiments of the present disclosure may be variously modified and may have various forms, specific embodiments will be shown in the drawings and will be described in detail in this specification or this disclosure. However, the embodiments according to the concept of the present disclosure are not limited to such specific embodiments, and it should be understood that the present disclosure includes all alterations, equivalents, and substitutes that fall within the idea and technical scope of the present disclosure.

It will be understood that, although the terms "first", "second", etc. may be used herein to describe various elements, corresponding elements should not be understood to be limited by these terms, which are used only to distinguish one element from another. For example, within the scope defined by the present disclosure, a first element may be referred to as a second element, and similarly, a second element may be referred to as a first element.

It will be understood that, when a component is referred to as being "connected to" or "coupled to" another component, it may be directly connected to or coupled to the other component, or intervening components may be present. In contrast, when a component is referred to as being "directly connected to" or "directly coupled to" another component, there are no intervening components present. Other terms that describe the relationship between components, such as "between" and "directly between" or "adjacent to" and "directly adjacent to", must be interpreted in the same manner.

The terms used in this specification are provided only to explain specific embodiments, but are not intended to restrict the present disclosure. A singular representation may include a plural representation unless it represents a definitely different meaning from the context. It will be further understood that the terms "comprises", "has" and the like, when used in this specification, specify the presence of stated features, numbers, steps, operations, elements, components or combinations thereof, but do not preclude the presence or addition of one or more other features, numbers, steps, operations, elements, components, or combinations thereof.

Unless otherwise defined, all terms, including technical and scientific terms, used in this specification have the same meanings as those commonly understood by a person having ordinary skill in the art to which the present disclosure pertains. It will be further understood that terms, such as those defined in commonly used dictionaries, should be interpreted as having meanings consistent with their meanings in the context of the may relevant art and the present disclosure, and are not to be interpreted in an idealized or overly formal sense unless expressly so defined herein.

FIG. 1 is a view showing the construction of a platooning control system according to the present disclosure. The platooning control system generally includes a slope determination unit 11, a slope distance information calculation unit 12, and a driving controller 14.

A platooning control system according to a preferred embodiment of the present disclosure will be described with reference to the figure. First, the slope determination unit 11 determines whether a preceding vehicle has entered a slope section based on a trailing vehicle during driving of platooning vehicles.

Upon determining that the preceding vehicle has entered the slope section, the slope distance information calculation unit 12 calculates and acquires longitudinal distance information from the preceding vehicle using a dead-reckoning (DR) sensor 40 mounted in a host vehicle.

The driving controller 14 performs platooning control of the host vehicle in the slope section based on the longitudinal distance information acquired by the DR sensor 40 and speed information.

Figure 3:
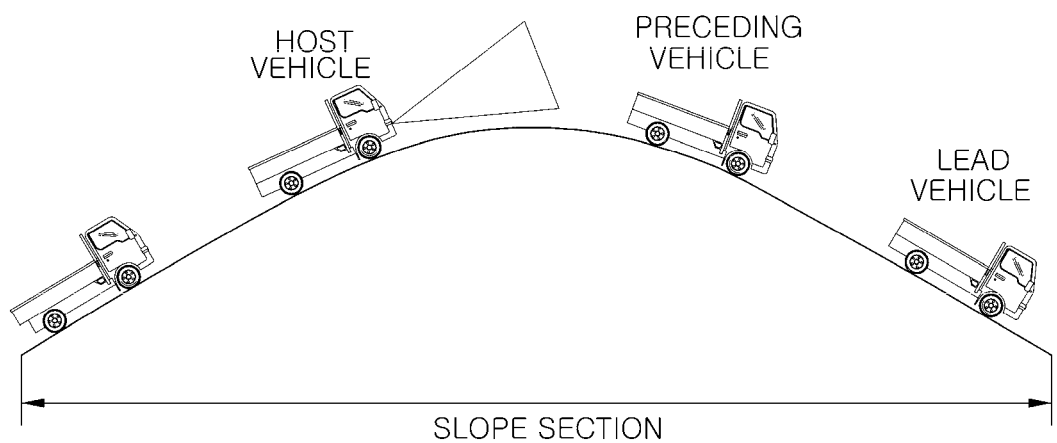
FIG. 3 is a view showing a situation in which platooning vehicles according to the present disclosure drive in a slope section.

For example, the preceding vehicle means a vehicle that drives ahead of the host vehicle, among a plurality of platooning vehicles. In the case in which four vehicles platoon, as shown in FIG. 3, a second vehicle is a preceding vehicle on the assumption that a third vehicle is a host vehicle. In the same manner, the third vehicle is a preceding vehicle on the assumption that a fourth vehicle is a host vehicle.

The DR sensor 40 is a sensor used for dead-reckoning. Here, dead-reckoning is a calculation method of detecting movement distance and azimuth using distance and azimuth sensors installed in a vehicle to estimate the current position of the vehicle.

The longitudinal distance information between the host vehicle and the preceding vehicle is calculated and acquired using the DR sensor 40.

The speed information may be received through a GPS 60 mounted in each vehicle.

That is, when the preceding vehicle enters the slope section during vehicle platooning, the longitudinal distance between the host vehicle and the preceding vehicle is acquired using DR data, the longitudinal speed of each of the host vehicle and the preceding vehicle is acquired through the GPS 60, and platooning control of the host vehicle is performed based on the acquired information.

Consequently, platooning control of the host vehicle in the slope section is continuously performed, whereby platooning control in the slope section is stably performed, and therefore it is possible to prevent the occurrence of an accident.

In addition, the slope determination unit 11 may determine whether the preceding vehicle has entered the slope section using a pitch value detected from the preceding vehicle.

Specifically, in the case in which the pitch value of a lead vehicle, among the platooning vehicles, is equal to or greater than a set value, the slope determination unit 11 determines whether the lead vehicle has entered the slope section using information from a navigation system 30.

Upon determining that the lead vehicle has entered the slope section, the pitch value of each of the platooning vehicles is detected. Here, each of the platooning vehicles is equipped with a pitch sensor 20, whereby it is possible to detect the pitch value of each vehicle.

In the case in which the pitch value of the preceding vehicle is equal to or greater than the set value, it is determined that the preceding vehicle has entered the slope section.

That is, in the case in which the pitch value of the lead vehicle, among the platooning vehicles, is increased to a predetermined value or more, it is determined whether the driving path on which the lead vehicle is located is the slope section using information from a navigation system 30 installed in the lead vehicle.

For example, in the case in which the driving path on which the lead vehicle is located includes an upward slope and a downward slope connected to each other, it may be determined that the lead vehicle has entered the slope section.

At this time, the pitch value of each vehicle may be shared by the platooning vehicles through communication.

Figure 4:
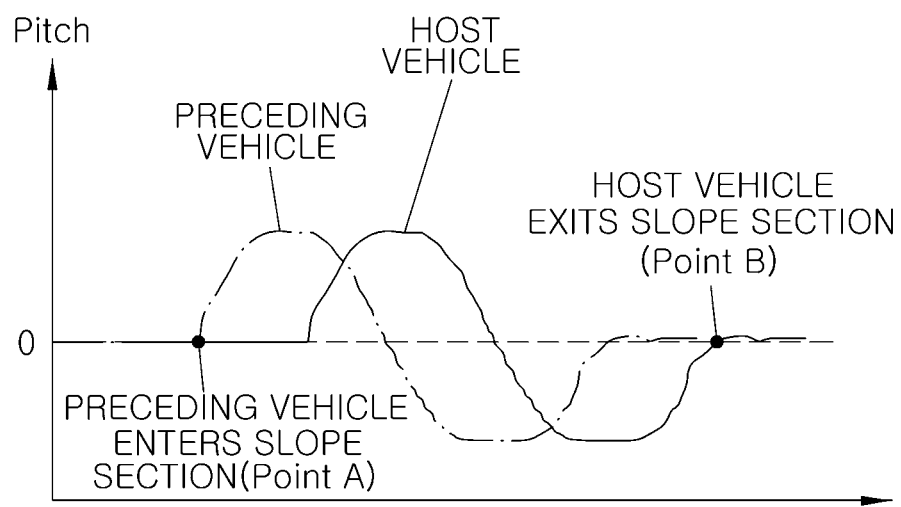
FIG. 4 is a view describing a point in time at which a preceding vehicle enters a slope section and a point in time at which a host vehicle exits the slope section in the present disclosure.

As shown in FIG. 4, in the case in which the pitch value of the preceding vehicle is increased like Point A during monitoring of the pitch value of the preceding vehicle, it is determined that the preceding vehicle has entered the slope section.

Furthermore, the slope determination unit 11 determines whether the host vehicle has exited the slope section during driving control in the slope section.

Upon determining that the host vehicle has exited the slope section, a flatland distance information calculation unit 13 configured to acquire the longitudinal distance information from the preceding vehicle using a front sensor 50 mounted in the host vehicle is further included.

Consequently, the driving controller 14 performs platooning control of the host vehicle in a flatland section deviating from the slope section based on the longitudinal distance information acquired by the front sensor 50 and the speed information.

For example, the front sensor 50, which is installed at the front of each vehicle, may be a radar, camera, or lidar. The longitudinal distance information between the host vehicle and the preceding vehicle is calculated and acquired using the front sensor 50.

That is, when the host vehicle exits the slope section while platooning control is performed after the platooning vehicles enter the slope section, the longitudinal distance between the host vehicle and the preceding vehicle is acquired using data detected by the front sensor 50, the longitudinal speed of each of the host vehicle and the preceding vehicle is acquired through the GPS 60, and platooning control of the host vehicle is performed based on the acquired information.

Also, in the case in which the pitch value of the host vehicle is increased to the set value or more, is decreased to less than the set value, and is increased again to the set value, the slope determination unit 11 may determine that the host vehicle has exited the slope section. Here, the set value may be set to a specific range including a pitch value of 0, although the set value may be set to a specific value.

That is, after the preceding vehicle enters the slope section, the host vehicle also enters the slope section and the pitch value of the host vehicle is increased. As shown in FIG. 4, in the case in which the pitch value of the host vehicle is decreased and is then increased like Point B during monitoring of the pitch value of the host vehicle, it is determined that the host vehicle has exited the slope section.

Furthermore, in the present disclosure, a flatland distance information calculation unit 13 configured to acquire the longitudinal distance information from the preceding vehicle using the front sensor 50 mounted in the host vehicle before the preceding vehicle enters the slope section is further included.

Consequently, the driving controller 14 performs platooning control of the host vehicle in the flatland section based on the longitudinal distance information acquired by the front sensor 50 and the speed information.

That is, in the flatland section, the longitudinal distance information between the host vehicle and the preceding vehicle is acquired using data of the front sensor 50, and platooning control is performed using the acquired longitudinal distance information.

When the vehicles enter the slope section from the flatland section during platooning control, however, the longitudinal distance information between the host vehicle and the preceding vehicle is acquired using data of the DR sensor 40 instead of using the data of the front sensor 50, and platooning control is performed using the acquired longitudinal distance information.

Meanwhile, in the present disclosure, in the case in which the host vehicle has entered a downward slope during driving control performed by the driving controller 14, the deceleration amount of the host vehicle may be compensated based on the inclination of the downward slope, and the compensated deceleration amount of the host vehicle may be reflected in platooning control of the host vehicle. Namely, the compensated deceleration amount may be added to, multiplied, or subtracted in the platooning control, as an example.

To this end, in the present disclosure, a time-to-collision calculation unit 15, a required deceleration calculation unit 16, a required deceleration compensation unit 17, and a braking control value calculation unit 18 are further included.

Specifically, the time-to-collision calculation unit 15 detects the distance from the preceding vehicle using the front sensor 50 installed in each vehicle, and calculates a time to collision using the distance and relative speed between the host vehicle and the preceding vehicle.

Figure 6:
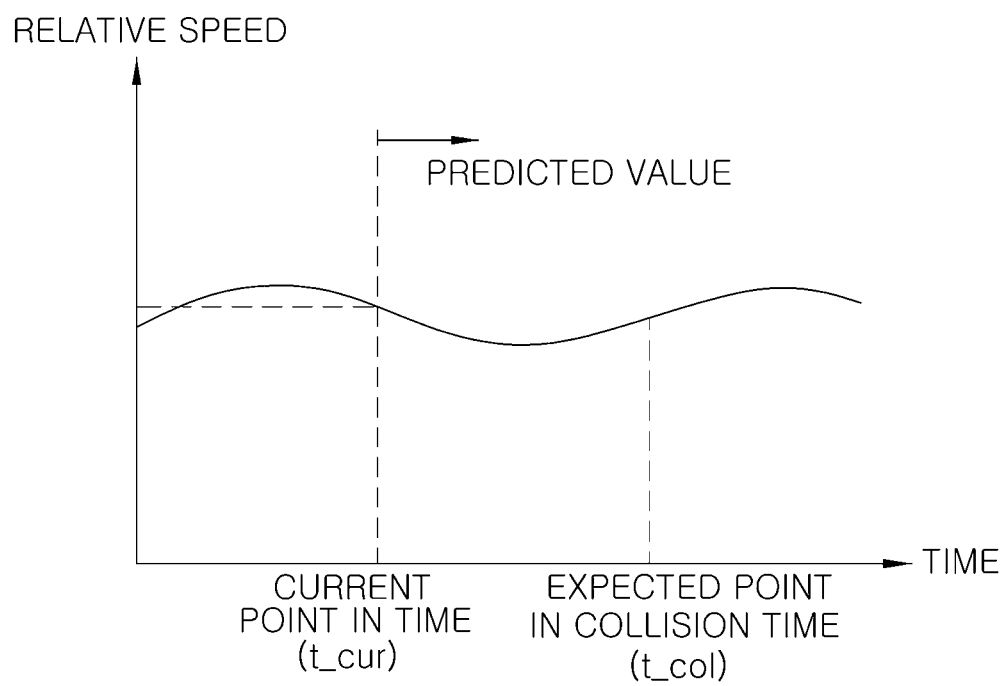
FIG. 6 is a view illustrating a current point in time and an expected point in collision time at a specific relative speed between the host vehicle and the preceding vehicle.

For example, the time to collision is a value obtained by subtracting the current point in time from an expected point in collision time. In FIG. 6, the expected point in collision time from the current point in time is shown based on a specific relative speed between the host vehicle and the preceding vehicle.

Time to collision (TTC)=expected point in collision time ($t\_col$)−current point in time ($t\_cur$)

Figure 7:
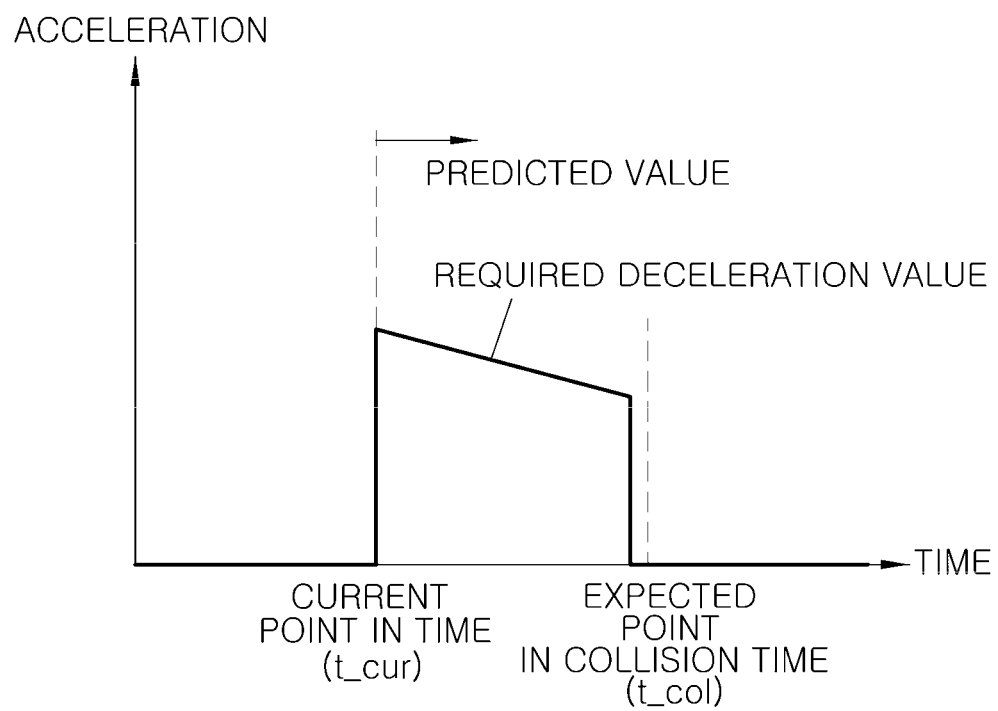
FIG. 7 is a view illustrating a required deceleration profile in which a required deceleration value starts to be calculated from the current point in time and the required deceleration value is changed over time.

The required deceleration calculation unit 16 calculates required deceleration of the host vehicle necessary to make the relative speed between the host vehicle and the preceding vehicle based on the time to collision. In FIG. 7, a required deceleration profile in which a required deceleration value starts to be calculated from the current point in time and the required deceleration value is changed over time is illustrated.

The required deceleration compensation unit 17 reflects the inclination of the downward slope in the required deceleration to compensate for the required deceleration. Namely, the required deceleration compensation unit 17 may add, multiply, or subtract in the inclination, as an example. Here, the inclination of the downward slope may be calculated using a pitch value detected by a pitch sensor 20.

Figure 8:
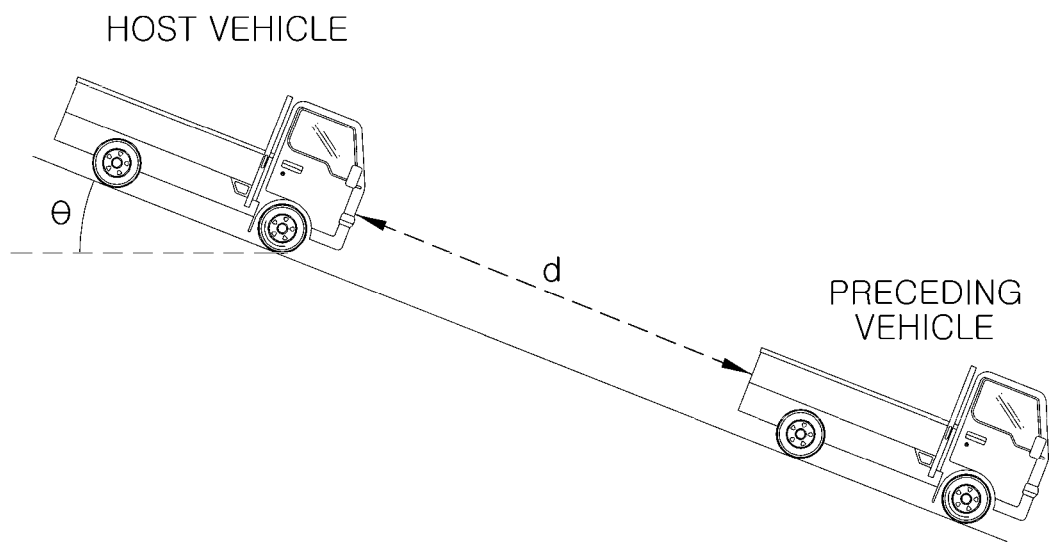
FIG. 8 is a view illustrating the longitudinal distance between the host vehicle and the preceding vehicle and a downward slope.

For example, a required deceleration compensation value is calculated by reflecting an inclination value of a road surface in the required deceleration, as shown in the following equation. In FIG. 8, the longitudinal distance between the host vehicle and the preceding vehicle and the downward slope are illustrated.

Required deceleration compensation value (req_$a$_comp) [m/s$^2$]=required deceleration (req_$a$) [m/s$^2$]+$g$×sin(θ) [m/s$^2$]

The braking control value calculation unit 18 calculates a target braking control value necessary to realize the required deceleration compensation value, and transmits the calculated target braking control value to the driving controller 14 so as to be reflected in platooning control of the host vehicle. The target braking control value may be calculated by adding a tolerance value and a tuning value to the required deceleration compensation value.

Target braking control value=required deceleration compensation value (req_$a$_comp)+tolerance value+tuning value (α)

That is, in the case in which the host vehicle drives along the downward slope of the slope section during vehicle platooning, the braking control value calculated depending on the inclination is further reflected in the deceleration amount necessary for platooning control of the host vehicle, whereby the distance between the host vehicle and the preceding vehicle in the downward slope section is more stably maintained, and therefore it is possible to prevent collision between the vehicles.

Figure 2:
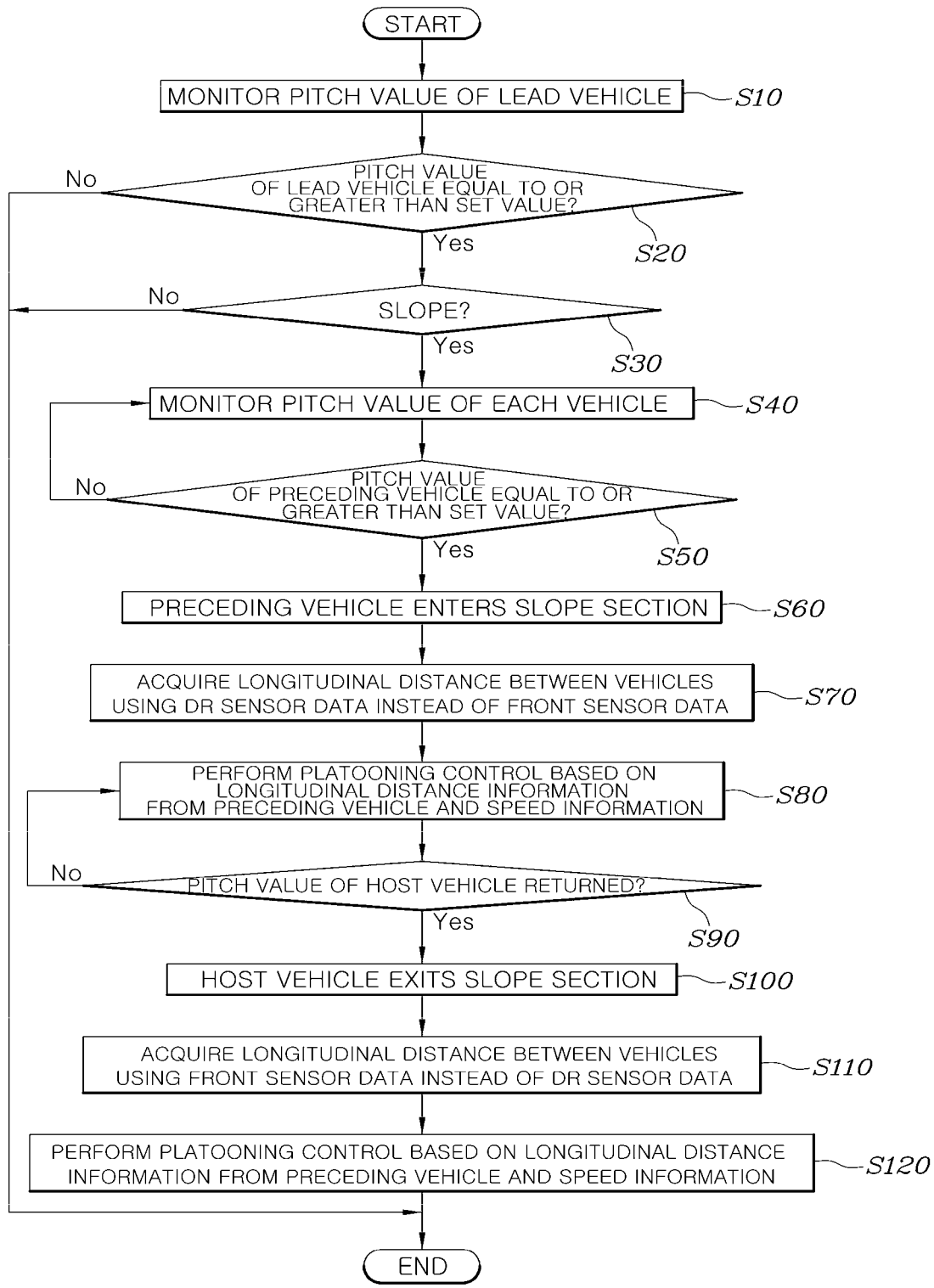
FIG. 2 is a flowchart entirely illustrating a platooning control process in a slope section according to the present disclosure.

FIG. 2 is a flowchart entirely illustrating a platooning control process in a slope section according to the present disclosure.

Before describing the platooning control process according to the present disclosure, a control device 10 according to an exemplary embodiment of the present disclosure will be described. The control device 10 may be implemented by an algorithm configured to control the operation of various components of a vehicle, a non-volatile memory (not shown) configured to store data on software commands that reproduce the algorithm, or a processor (not shown) configured to perform the following operation using the data stored in the memory. Here, the memory and the processor may be implemented as individual chips. Alternatively, the memory and the processor may be implemented as an integrated chip. One or more processors may be provided.

Referring to the figure, the platooning control method according to the present disclosure includes a slope entry determination step of the control device 10 determining whether a preceding vehicle has entered a slope section during driving of vehicles, a slope distance information calculation step of the control device 10 acquiring longitudinal distance information from the preceding vehicle using a dead-reckoning (DR) sensor 40 mounted in a host vehicle upon determining that the preceding vehicle has entered the slope section, and a slope driving control step of the control device 10 performing platooning control of the host vehicle in the slope section using the longitudinal distance information acquired by the DR sensor 40 and speed information.

That is, when the preceding vehicle enters the slope section during vehicle platooning, the longitudinal distance between the host vehicle and the preceding vehicle is acquired using DR data, the longitudinal speed of each of the host vehicle and the preceding vehicle is acquired through a GPS 60, and platooning control of the host vehicle is performed based on the acquired information.

Consequently, platooning control of the host vehicle in the slope section is continuously performed, whereby platooning in the slope section is stably controlled, and therefore it is possible to prevent the occurrence of an accident.

In addition, in the slope entry determination step, it may be determined whether the preceding vehicle has entered the slope section using a pitch value detected from the preceding vehicle.

The process of determining whether the preceding vehicle has entered the slope section will be described for each step. The slope entry determination step includes a step of, in the case in which the pitch value of a lead vehicle, among the platooning vehicles, is equal to or greater than a set value, determining whether the lead vehicle has entered the slope section using information from a navigation system 30, a step of, upon determining that the lead vehicle has entered the slope section, detecting the pitch value of each of the platooning vehicles, and a step of, in the case in which the pitch value of the preceding vehicle is equal to or greater than the set value, determining that the preceding vehicle has entered the slope section.

In addition, during driving in the slope section, the preceding vehicle exits the slope section, and then the host vehicle exits the slope section. When the host vehicle exits the slope section, a front sensor 50 is used to acquire longitudinal distance information.

The process of acquiring the longitudinal distance information in a flatland section after exiting the slope section will be described for each step. This process includes a slope exit determination step of determining whether the host vehicle has exited the slope section in the slope driving control step, a flatland distance information calculation step of, upon determining that the host vehicle has exited the slope section, acquiring longitudinal distance information from the preceding vehicle using a front sensor 50 mounted in the host vehicle, and a flatland driving control step of performing platooning control of the host vehicle in the flatland section deviating from the slope section based on the longitudinal distance information acquired by the front sensor 50 and the speed information.

That is, when the host vehicle exits the slope section while platooning control is performed after the platooning vehicles enter the slope section, the longitudinal distance between the host vehicle and the preceding vehicle is acquired using data detected by the front sensor 50, the longitudinal speed of each of the host vehicle and the preceding vehicle is acquired through the GPS 60, and platooning control of the host vehicle is performed based on the acquired information.

Also, in the slope exit determination step, in the case in which the pitch value of the host vehicle is increased to the set value or more, is decreased to less than the set value, and is increased again to the set value, it may be determined that the host vehicle has exited the slope section.

Furthermore, in the present disclosure, the longitudinal distance information from the preceding vehicle is acquired using the front sensor 50 before the preceding vehicle enters the slope section.

The process of acquiring the longitudinal distance information in the flatland section using the front sensor 50 will be described for each step. This process includes a flatland distance information acquisition step of acquiring the longitudinal distance information from the preceding vehicle using the front sensor 50 mounted in the host vehicle before the preceding vehicle enters the slope section and a flatland driving control step of performing platooning control of the host vehicle in the flatland section based on the longitudinal distance information acquired by the front sensor 50 and the speed information.

Figure 5:
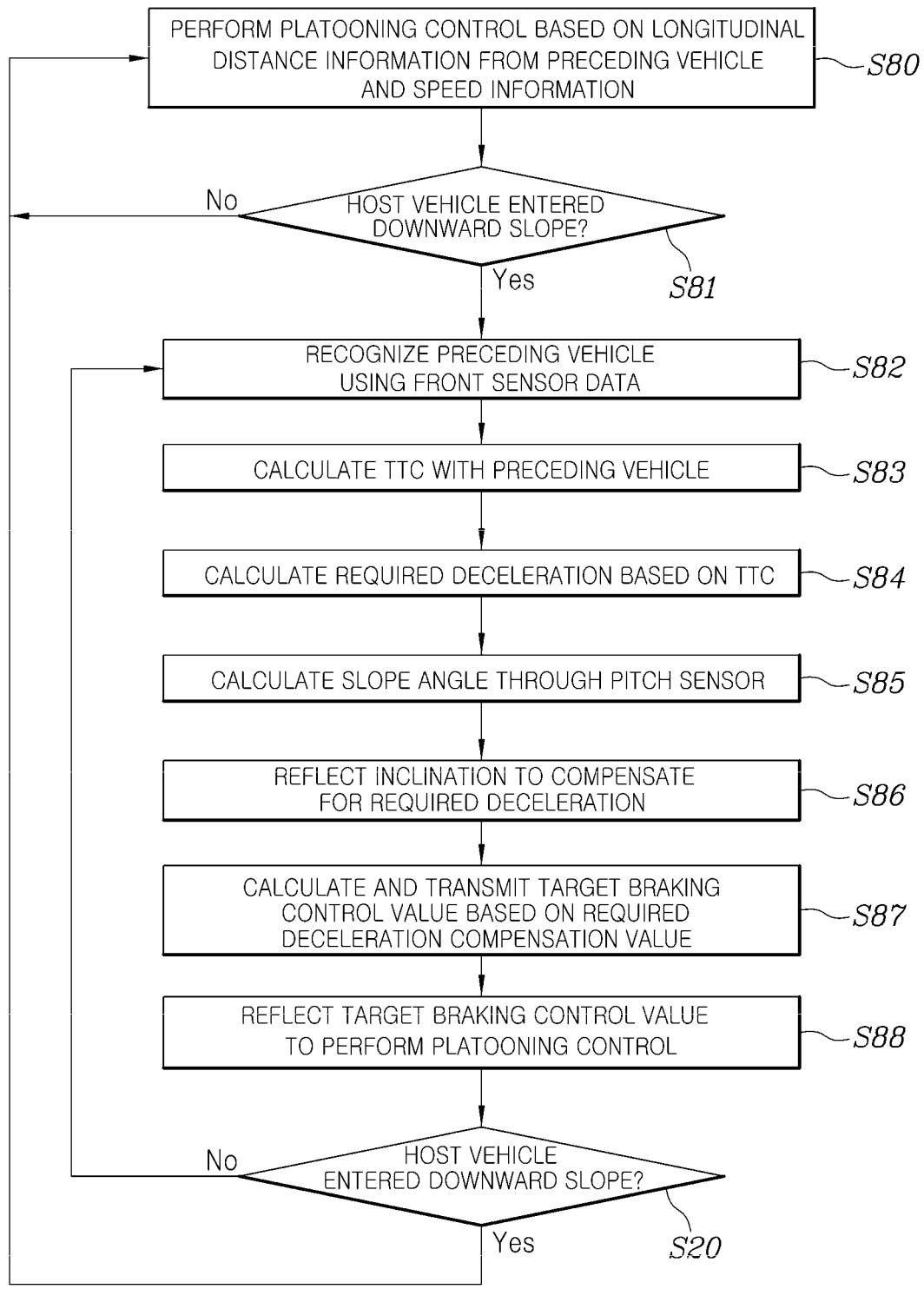
FIG. 5 is a flowchart illustrating a process of controlling braking force of the host vehicle on a downward slope of the slope section in the present disclosure.

Meanwhile, FIG. 5 is a flowchart illustrating a process of controlling braking force of the host vehicle on a downward slope of the slope section in the present disclosure.

Referring to the figure, in the slope driving control step, in the case in which the host vehicle has entered the downward slope, the deceleration amount of the host vehicle may be compensated based on the inclination of the downward slope, and the compensated deceleration amount of the host vehicle may be reflected in platooning control of the host vehicle.

The process of compensating for the deceleration amount of the host vehicle and reflecting the compensated deceleration amount of the host vehicle in platooning control will be described for each step. This process includes a step of calculating a time to collision using the distance and relative speed between the host vehicle and the preceding vehicle, a step of calculating required deceleration of the host vehicle necessary to make the relative speed between the host vehicle and the preceding vehicle based on the time to collision, a step of reflecting the inclination of the downward slope in the required deceleration to compensate for the required deceleration, and a step of calculating a target braking control value necessary to realize the required deceleration compensation value and transmitting the calculated target braking control value so as to be reflected in platooning control of the host vehicle.

Hereinafter, a process of controlling driving of platooning vehicles according to a preferred embodiment of the present disclosure will be described with reference to FIG. 2. During driving of the platooning vehicles, the pitch value of a lead vehicle is monitored using a pitch sensor 20 mounted in the lead vehicle (S10).

During monitoring, it is determined whether the pitch value of the lead vehicle is equal to or greater than a set value (S20). Upon determining that the pitch value of the lead vehicle is equal to or greater than the set value, it is determined whether the driving path on which the lead vehicle is located is a slope section using information from a navigation system 30 mounted in the lead vehicle (S30).

Upon determining that the driving path on which the lead vehicle is located is the slope section, the pitch value of each of the platooning vehicles is monitored using the pitch sensor 20 mounted in each vehicle (S40).

It is determined whether the pitch value of the preceding vehicle ahead of the host vehicle based on the host vehicle is equal to or greater than the set value during monitoring process of step S40 (S50). Upon determined that the pitch value of the preceding vehicle is equal to or greater than the set value, it is determined that the preceding vehicle has entered the slope section (S60).

When the preceding vehicle has entered the slope section, DR data are acquired through a DR sensor 40 mounted in the host vehicle to calculate longitudinal distance information between the host vehicle and the preceding vehicle (S70).

Subsequently, platooning control of the host vehicle is performed based on the calculated longitudinal distance information and speed information acquired through a GPS 60 (S80).

That is, when the preceding vehicle has entered the slope section, the longitudinal distance between the host vehicle and the preceding vehicle and the speed information are acquired using the DR data and the GPS 60, and platooning control is performed based on the acquired information, whereby it is possible to stably perform platooning control of the host vehicle in the slope section without interruption, and therefore it is possible to prevent the occurrence of an accident.

Meanwhile, in step S80, it is determined whether the pitch value of the host vehicle is increased to a positive (+) value as the result of entry into the slope section, is decreased to a negative (−) value while moving over the top of the slope, and is increased again to a pitch value immediately before entry into the slope section (S90).

In the case in which the determination condition of step S90 is satisfied, it is determined that the host vehicle has exited the slope section (S100).

In the case in which the host vehicle has exited the slope section and entered a flatland section, data are acquired through a front sensor 50 mounted in the host vehicle to calculate longitudinal distance information between the host vehicle and the preceding vehicle (S110).

Subsequently, platooning control of the host vehicle is performed based on the calculated longitudinal distance information and the speed information acquired through the GPS 60 (S120).

That is, when the preceding vehicle enters the flatland section, the longitudinal distance between the host vehicle and the preceding vehicle and speed information are acquired using the data of the front sensor 50 and the GPS 60, and platooning control is performed based on the acquired information, whereby platooning control of the host vehicle in the flatland section is stably performed.

Meanwhile, a process of compensating for deceleration amount in a downward slope to perform platooning control will be described with reference to FIG. 5. In a process of performing platooning control of the host vehicle using the longitudinal distance information calculated in step S80 and the speed information acquired through the GPS 60, it is determined whether the host vehicle has entered the downward slope using the pitch sensor 20 (S81).

Upon determining that the host vehicle has entered the downward slope, the preceding vehicle is recognized using data of the front sensor 50 (S82).

Subsequently, a time to collision between the host vehicle and the preceding vehicle is calculated using the distance between the host vehicle and the preceding vehicle and speed data (S83).

Subsequently, required deceleration of the host vehicle necessary to make the relative speed between the host vehicle and the preceding vehicle is calculated based on the time to collision (S84).

Subsequently, the inclination of the downward slope is reflected in the required deceleration to compensate for the required deceleration (S85).

Subsequently, a target braking control value necessary to realize the required deceleration compensation value is calculated (S86), and the calculated target braking control value is transmitted to a driving controller 14 such that the target braking control value is reflected in platooning control of the host vehicle (S87).

Subsequently, the driving controller 14 reflects the target braking control value in platooning control to control driving of the host vehicle (S88).

Consequently, the deceleration amount is compensated depending on the inclination of the downward slope to perform platooning control of the vehicles, whereby it is possible to prevent the occurrence of collision between the vehicles due to abrupt decrease in distance between the vehicles due to the characteristics of the slope path, and therefore it is possible to stably perform platooning control.

As is apparent from the above description, according to the present disclosure, when a preceding vehicle exits a slope section during vehicle platooning, the longitudinal distance between a host vehicle and the preceding vehicle is acquired using DR data, and platooning control of the host vehicle is performed based on the acquired longitudinal distance and longitudinal speed.

Consequently, platooning control of the host vehicle in the slope section is continuously performed, whereby platooning control in the slope section is stably performed, and therefore it is possible to prevent the occurrence of an accident.

Although the preferred embodiments of the present disclosure have been described above with reference to the accompanying drawings, those skilled in the art will appreciate that the present disclosure can be implemented in various other embodiments without changing the technical ideas or features thereof.

What is claimed is:

1. A platooning control method comprising:
a slope entry determination step of a control device determining whether a preceding vehicle, which is located to be in front of a host vehicle, has entered a slope section when a plurality of vehicles including the host vehicle and the preceding vehicle are moving on a road;
a slope distance information calculation step of the control device acquiring longitudinal distance information between the host vehicle and the preceding vehicle using a sensor of the host vehicle upon determining that the preceding vehicle has entered the slope section; and
a slope driving control step of the control device performing platooning control of the plurality of vehicles, in which the host vehicle is involved, in the slope section using the longitudinal distance information acquired by the sensor and speed information,
wherein the slope driving control step includes, in response to determining that the host vehicle has entered a downward slope:
adjusting a deceleration amount of the host vehicle based on an inclination of the downward slope; and
reflecting the adjusted deceleration amount of the host vehicle in the platooning control,
wherein the adjusting a deceleration amount of the host vehicle further includes:
calculating a time to collision using a distance and a relative speed between the host vehicle and the preceding vehicle;
calculating a required deceleration value of the host vehicle that necessitates the relative speed between the host vehicle and the preceding vehicle to become zero, based on the calculated time to collision;

reflecting the inclination of the downward slope in the required deceleration value to compensate for the required deceleration value; and calculating a target braking control value necessary to realize a required deceleration compensation value and transmitting the calculated target braking control value to be reflected in the platooning control.

2. The platooning control method according to claim 1, wherein the slope entry determination step includes determining whether the preceding vehicle has entered the slope section using a pitch value of the preceding vehicle.

3. The platooning control method according to claim 2, wherein the slope entry determination step further comprises:

in response to determining that a pitch value of a lead vehicle, which is located very front among platooning vehicles, is equal to or greater than a set value, determining whether the lead vehicle has entered the slope section using navigation information;

upon determining that the lead vehicle has entered the slope section, detecting the pitch value of each of the platooning vehicles; and in response to determining that the pitch value of the preceding vehicle is equal to or greater than the set value, determining that the preceding vehicle has entered the slope section.

4. The platooning control method according to claim 1, further comprising:

a slope exit determination step of determining whether the host vehicle has exited the slope section in the slope driving control step;

a flatland distance information calculation step of, upon determining that the host vehicle has exited the slope section, acquiring longitudinal distance information between the host vehicle and the preceding vehicle using a front sensor of the host vehicle; and a flatland driving control step of performing platooning control by the host vehicle with the plurality of vehicles in a flatland section once the host vehicle has deviated from the slope section based on the longitudinal distance information acquired by the front sensor and the speed information.

5. The platooning control method according to claim 4, wherein the slope exit determination step includes, in response to determining that the pitch value of the host vehicle is increased to the set value or more, is decreased to less than the set value, and then is increased again to the set value, determining that the host vehicle has exited the slope section.

6. The platooning control method according to claim 1, further comprising:

a flatland distance information acquisition step of the control device acquiring longitudinal distance information between the host vehicle and the preceding vehicle using a front sensor of the host vehicle in response to determining that the preceding vehicle is on a flatland section; and a flatland driving control step of the control device performing the platooning control in the flatland section based on the longitudinal distance information acquired by the front sensor and the speed information.

7. The platooning control method according to claim 1, wherein the speed information is acquired by a Global Positioning System (GPS).

8. A platooning control system comprising a processor configured to:

determine whether a preceding vehicle, which is located to be in front of a host vehicle, has entered a slope section when a plurality of vehicles including the host vehicle and the preceding vehicle are moving on a road;

acquire longitudinal distance information between the host vehicle and the preceding vehicle using a sensor of the host vehicle upon determining that the preceding vehicle has entered the slope section, and perform platooning control of the plurality of vehicles, in which the host vehicle is involved, in the slope section using the longitudinal distance information acquired by the sensor and speed information, wherein, in response to determining that the host vehicle has entered a downward slope, the processor is further configured to adjust a deceleration amount of the host vehicle based on an inclination of the downward slope and to reflect the adjusted deceleration amount of the host vehicle in the platooning control, wherein, in response to determining that the host vehicle has entered the downward slope, the processor:

calculates a time to collision using a distance and a relative speed between the host vehicle and the preceding vehicle, calculates a required deceleration value of the host vehicle that necessitates the relative speed between the host vehicle and the preceding vehicle to become zero, based on the calculated time to collision, reflects the inclination of the downward slope in the required deceleration value to compensate for the required deceleration value, and calculates a target braking control value necessary to realize a required deceleration compensation value and transmit the calculated target braking control value to the driving controller to be reflected in the platooning control.

9. The platooning control system according to claim 8, wherein the processor is configured to determine whether the preceding vehicle has entered the slope section using a pitch value of the preceding vehicle.

10. The platooning control system according to claim 8, wherein the processor is further configured to:

in response to determining that a pitch value of a lead vehicle, which is located very front among platooning vehicles, is equal to or greater than a set value, determine whether the lead vehicle has entered the slope section using navigation information, upon determining that the lead vehicle has entered the slope section, detect the pitch value of each of the platooning vehicles, and in response to determining that the pitch value of the preceding vehicle is equal to or greater than the set value, determine that the preceding vehicle has entered the slope section.

11. The platooning control system according to claim 8, wherein the processor is further configured to:

determine whether the preceding vehicle has exited the slope section, upon determining that the preceding vehicle has exited the slope section, acquire longitudinal distance information between the host vehicle and the preceding vehicle using a front sensor of the host vehicle, and perform platooning control by the host vehicle with the plurality of vehicles in a flatland section once the host vehicle has deviated from the slope section based on the longitudinal distance information acquired by the front sensor and the speed information.

12. The platooning control system according to claim 11, wherein the processor is further configured to, in response to determining that the pitch value of the host vehicle is increased to the set value or more, is decreased to less than the set value, and then is increased again to the set value, determine that the host vehicle has exited the slope section.

13. The platooning control system according to claim 8, wherein the processor is further configured to:
   acquire longitudinal distance information between the host vehicle and the preceding vehicle using a front sensor of the host vehicle in response to determining that the preceding vehicle is on a flatland section, and
   perform platooning control by the host vehicle with the plurality of vehicles in the flatland section based on the longitudinal distance information acquired by the front sensor and the speed information.

14. The platooning control system according to claim 8, wherein the speed information is acquired by a Global Positioning System (GPS).

\* \* \* \* \*